United States Patent
Lewis

[15] 3,688,880
[45] Sept. 5, 1972

[54] SHIFTING MECHANISM FOR MULTIPLE SPEED STRUCTURE

[72] Inventor: George E. Lewis, Hialeah, Fla.
[73] Assignee: Power Flo Products Incorporated, Hialeah, Fla.
[22] Filed: Oct. 12, 1970
[21] Appl. No.: 79,877

[52] U.S. Cl. ................................. 192/4, 74/337.5
[51] Int. Cl. ........................ F16d 67/02, F16h 5/06
[58] Field of Search ........ 74/337.5; 192/93 R, 193 R, 192/4 C

[56] References Cited

UNITED STATES PATENTS

| | | | |
|---|---|---|---|
| 2,967,596 | 1/1961 | Page | 192/4 C |
| 3,165,181 | 1/1965 | Hampton et al. | 192/4 C |
| 3,312,318 | 4/1967 | Ryan | 192/4 C |
| 3,457,798 | 6/1969 | Musgrave | 74/337.5 X |
| 901,456 | 10/1908 | Loitron | 74/337.5 X |
| 1,715,178 | 5/1929 | Tredway | 74/337.5 X |
| 2,814,959 | 12/1957 | Dodge | 74/337.5 X |
| 3,426,611 | 2/1969 | Hauser | 74/337.5 X |

Primary Examiner—Arthur T. McKeon
Attorney—Whittemore, Hulbert & Belknap

[57] ABSTRACT

Transaxle structure including three forward speeds and one reverse speed having a vertical drive and a braked driving shaft in which shifting between the three forward speeds and reverse speed is accomplished by clutch structures engaged with shifting forks which forks are moved in accordance with the angular position of a rotary camming disk and which camming disk is angularly positioned by a shifting lever secured to a shifting link coupled to the camming disk by a pin and slot lost motion connection.

In another modification shifting a four speed gearbox is accomplished by means of shifting forks engaging clutch structures, which shifting forks are positioned in accordance with a sliding cam member actuated on pivotal movement of a shifting lever connected thereto by a sliding connection. The camming slide may have an external camming surface or may have an internal camming slot in which case the shifting forks may be connected thereto by pin structures.

9 Claims, 12 Drawing Figures

INVENTOR.
GEORGE E. LEWIS
ATTORNEYS

INVENTOR.
GEORGE E. LEWIS
BY Whittemore
Hulbert & Belknap
ATTORNEYS

SHIFTING MECHANISM FOR MULTIPLE SPEED STRUCTURE

CROSS REFERENCE TO RELATED APPLICATIONS

The present invention relates to improvements in the invention disclosed in applicant's prior U.S. Pat. No. 3,370,477 and the reissue thereof, a request for reissue of which was filed on June 9, 1969, and which reissue application was given Ser. No. 835,885.

BACKGROUND OF THE INVENTION

1. Field of the Invention

The invention relates to transmission structure and refers more specifically to a multiple speed transaxle structure and gearbox which are particularly simple and efficient and therefore economical and which include unique shifting mechanism. The shifting mechanism may be either in the form of a rotatable cam disk or a slidable cam plate operable in conjunction with shifting forks and means for rotating the disk or sliding the plate in response to shifting the position of a shifting lever.

2. Description of the Prior Art

In the past, multiple speed reversible transaxle structures have been known. The prior multiple speed transaxle structures, however, have usually been driven by means of a shaft positioned axially with respect to the shafts on which the gears of the transaxle structure have been secured. Further, the shifting mechanism for past multiple speed transaxle structures has usually been mounted on top of the transaxle structure and included a shifting lever with a centrally pivoted portion, an end for moving the lever about the pivoted central portion thereof and an end engageable with clutch or other shifting structure within the transaxle structure to shift the speed of the output of the transaxle structure with regard to the driving speed therefor. Such transaxle structure and the shifting structure therefor has lacked required versatility for compact placement of the transaxle structure and driving motor therefor in vertically stacked relation and has often been complicated. In addition, the prior shifting mechanism has often been inefficient and subject to high maintenance and repair costs.

SUMMARY OF THE INVENTION

The invention includes a three speed forward and one speed reverse transaxle structure which may be driven from a vertically positioned input shaft and which includes a braked driving shaft. The shifting mechanism of the transaxle structure is a rotatable camming disk engaged with shifting forks and rotated by means of an actuating link secured to a side mounted shifting lever on the transaxle structure.

In a modification, the shifting mechanism includes a slide illustrated in conjunction with a four speed gearbox. The slide is actuated by a pivoted shifting lever and may include either camming edges therealong engageable with shifting forks or a camming slot for receiving shifting fork mounted pins.

DESCRIPTION OF THE PREFERRED EMBODIMENTS

Figure 1:
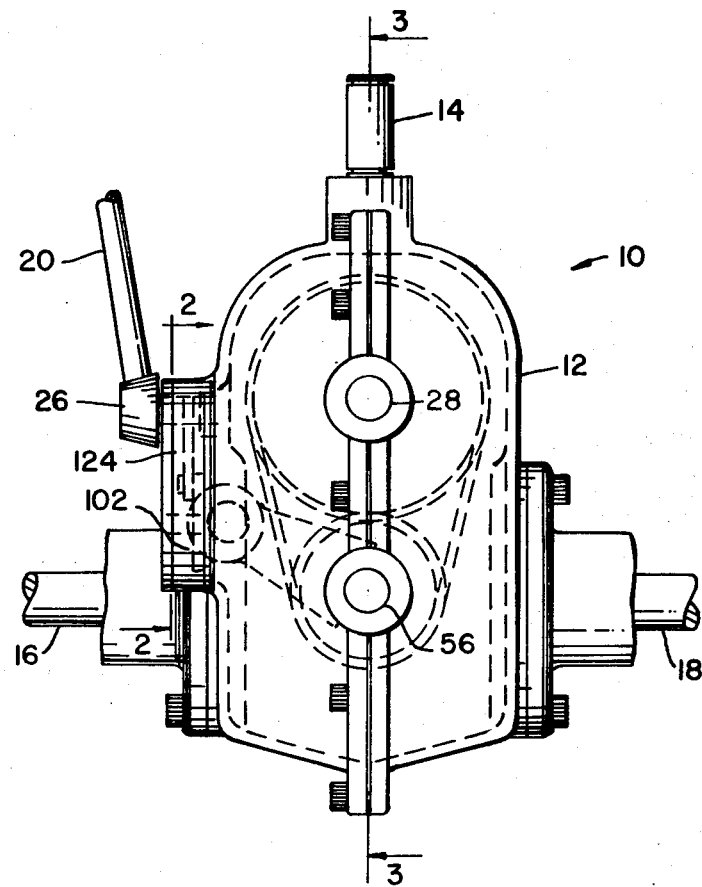
FIG. 1 is a front view of transaxle structure constructed in accordance with the invention.

The transaxle structure 10 as shown in FIG. 1 includes the housing 12, the input shaft 14 and the output shafts 16 and 18. The transaxle structure as shown also includes the side mounted shifting lever 20.

In operation, the transaxle structure of FIG. 1 is driven through the input shaft 14 to drive the output shafts or axles 16 and 18. The axles 16 and 18 may be driven at three separate speeds forward and one reverse speed for any driving speed of the shaft 14 in accordance with the actuation of the shifting mechanism 26 with the shifting lever 20.

Figure 3:
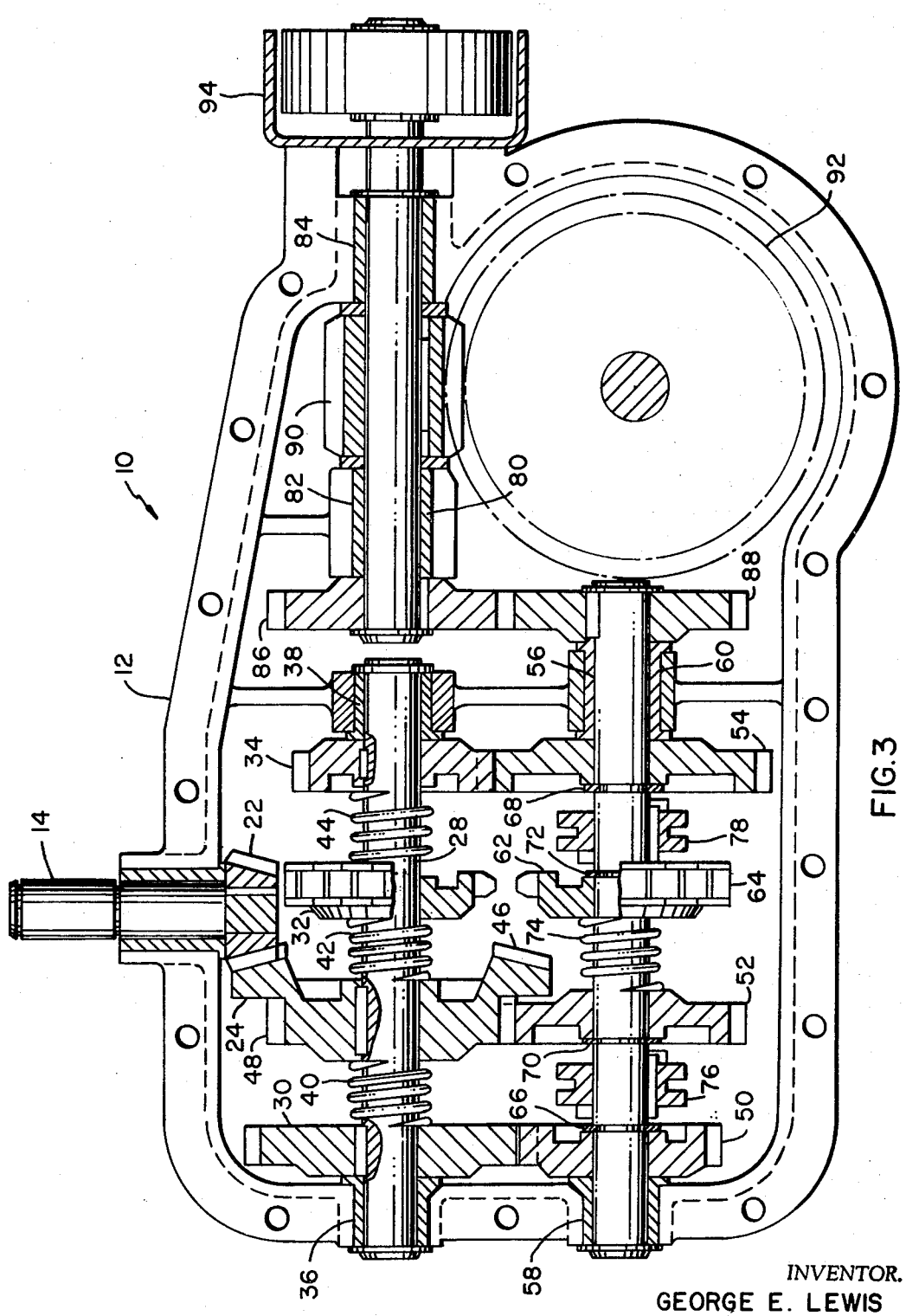
FIG. 3 is an enlarged longitudinal section view of the transaxle structure illustrated in FIG. 1 taken substantially on the line 3—3 in FIG. 1.

As shown in FIG. 3, the input shaft 14 is connected to a rotatable spur gear pinion 22 which drives the combination spur gear and pinion gear 24 mounted on the drive shaft 28 for rotation therewith. The spur gear 30, sprocket 32 and spur gear 34 are also mounted on the shaft 28 for rotation therewith. Shaft 28 in turn is mounted in the housing 12 in bearings 36 and 38. The springs 40, 42 and 44 are sleeved on the shaft 28 between the gear 30, the gear 24, the sprocket 32 and the gear 34, as shown, to maintain the gears and sprockets in spaced apart relation and are also operable to maintain the spur gear portion 46 of the combination gear 24 in engagement with the spur gear pinion 22.

The spur gear 30, spur gear portion 48 of the combination gear 24 and the spur gear 34 are in mesh with spur gear 50, spur gear 52 and spur gear 54 which are mounted for rotation on the shifting shaft 56 which is rotatably mounted in the housing 12 in the bearings 58 and 60. A sprocket 62 is also provided on the shifting shaft 56 and is connected to the sprocket 32 by means of the endless chain 64 extending around and between the sprockets 32 and 62.

Gears 50 and 54 are prevented from axial movement on the shifting shaft 56 by means of the rings 66 and 68. Similarly, the spur gear 52 and sprocket 62 are prevented from axial movement with respect to the shaft 56 by means of the rings 70 and 72 in conjunction with the spring 74 sleeved on the shaft 56.

Together the spur gears 34 and 54 provide a first gear or low speed for the transaxle structure 10, the spur gear portion 48 of the combination gear 24 and the spur gear 52 provide a second gear or speed for the transaxle structure 10, while a third speed is provided by the gear ratio between the spur gear 30 and the spur gear 50. A reverse speed is provided by means of the sprockets 32 and 62 and the chain 64 secured therearound.

The gear or speed of the transaxle structure 10 will depend on which of the gears 50, 52 and 54 and the sprocket 62 is connected to the shifting shaft 56 for rotation therewith. The gears 50 and 52 may be connected to the shaft 56 on movement of the clutch member 76 to the left or right respectively as illustrated in FIG. 3. Similarly, the sprocket 62 or the spur gear 54 may be connected to the shaft 56 by means of the clutch member 78 on movement thereof to the left or to the right respectively as shown in FIG. 3.

The clutch members 76 and 78 are sleeved over the shaft 56, are movable longitudinally of the shaft 56 and are restrained against rotation with respect thereto. As shown, the shifting structure is in a neutral position. That is to say, none of the gears 50, 52 or 54 nor the sprocket 62 is connected to the shaft 56 through the clutch members 76 or 78 for rotation therewith.

A third or driven shaft 80 is also mounted in the housing 12 in the bearings 82 and 84 for rotation and includes thereon a spur gear 86 connected thereto for rotation therewith which is engaged with a spur gear 88 secured to the shifting shaft 56 for rotation therewith. The shaft 80 is thus driven when the shaft 56 is driven. A worm 90 is positioned on the shaft 80 for rotation therewith. The worm 90 drives the differential gear structure 92 which in turn drives the axles 16 and 18 in a known manner.

Brake structure 94, which is not shown in detail since a plurality of different brake structures may be used, is shown in conjunction with the driven shaft 80. Thus, on shifting of the clutch members 76 and 78 into the neutral position as shown, the rotation of the axles 16 and 18 may be stopped by means of braking power applied through the brake structure 94 to the driven shaft 84.

Figure 2:
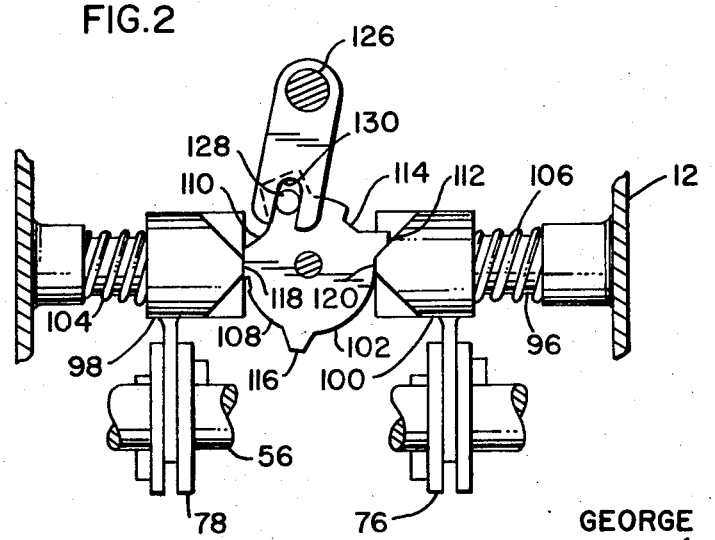
FIG. 2 is a partial section view of the transaxle structure illustrated in FIG. 1 taken substantially on the line 2—2 in FIG. 1 and showing the shifting mechanism thereof.

As shown in more detail in FIG. 2, the shifting mechanism 26 of the transaxle structure 10 includes a shifting fork shaft 96 mounted in the housing 12 parallel and adjacent to the shaft 56 on which shifting forks 98 and 100 engaging the clutch members 76 and 78 respectively are slidably mounted. The shifting forks 98 and 100 are operable on movement axially of the shaft 96 to move the clutch members 76 and 78 axially of the shaft 56. The shifting forks 98 and 100 are urged toward each other and into engagement with the camming disk 102 by means of the springs 104 and 106 sleeved on the shaft 96.

The camming disk 102 shown best in FIG. 2 includes a neutral circumference 108 thereon such that when the shifting forks 98 and 100 are in engagement with the neutral circumference or diameter thereof, the clutch members 76 and 78 are in the position shown in FIG. 3.

The camming disk 102 is provided with the reduced diameter portion 110, the projection 112, the projection 116 and the reduced diameter portion 114 on the outer periphery thereof in addition to the neutral circumference 108 against which the nose portions 118 and 120 of the shifting forks 98 and 100 are urged as the cam disk 102 is rotated to shift the clutch members 76 and 78 and thus provide the three forward speeds and one reverse speed for the transaxle structure 10.

As shown, the cam disk 102 is in a neutral position. If the cam is rotated counterclockwise to place the nose 118 of the shifting fork 98 in the recess 110, the clutch member 78 would be engaged with the sprocket 62 so that the transaxle would be driving the axles 16 and 18 in reverse.

On subsequent clockwise rotation of the camming disk 102, the nose 118 of the shifting fork 98 is cammed up to the neutral diameter or circumference 108 and rides therealong while the nose 120 of the shifting fork 100 is cammed onto the projection 112 at which time the clutch member 76 engages the high speed or first gear 50. Continuing the clockwise rotation of the camming disk 102 will permit the nose 120 of the shifting fork 100 to enter the recess 114 whereby the second or intermediate speed gear 52 will be engaged by the clutch member 76. Subsequently the projection 116 is engaged by the nose 118 of the shifting fork 98 to engage the clutch member 78 with the low or third speed gear 54, while the nose 120 of the shifting fork 100 rides on the neutral circumference 108 of the camming disk 102.

The structure for rotating the camming disk 102 includes the shifting lever 20 pivotally mounted in the housing 12 and the shifting link 124 rigidly secured to the shifting lever 20 by connecting pin 126 for rotation about the pin 126 on shifting of the lever 20, and the pin 128 on disk 102 positioned in the slot 130 in the shifting link 124. The slot 130 and pin 128 permit lost motion between the rotatable camming disk 102 and the shifting link 124.

In overall operation of the transaxle structure 10, the shaft 14 is driven as by a motor, not shown, positioned over the transaxle structure 10 and having a vertically extending drive shaft connected to the shaft 14 by convenient means, not shown. All of the gears 30, 24 and 34 and the sprocket 32 are thus continuously driven on the rotating shaft 28. The camming disk 102 is rotated so that one of the gears 50, 52 or 54 or the sprocket 62, all of which are driven on the shaft 56 when the gear with which they are meshed 30, 24, 34 and the sprocket 32 are driven, is caused to rotate the shaft 56 through a clutch member 76 or 78. The gear 88 is thus driven to drive the gear 86 and the shaft 80. The axles 16 and 18 are then driven through the differential structure 92 by means of the worm 90 secured to the shaft 80 for rotation therewith.

The driving speed of the axles 16 and 18 may be varied on rotation of the shifting cam 102 with the shifting lever 20 as previously indicated. The axles 16 and 18 may also be driven in reverse as previously indicated. With the camming disk 102 in a neutral position as illustrated in FIG. 3, the brake structure 94 may be applied to stop the rotation of the driven shaft 80 and therefore stop the rotation of the axles 16 and 18 of the transaxle 10.

Figure 4:
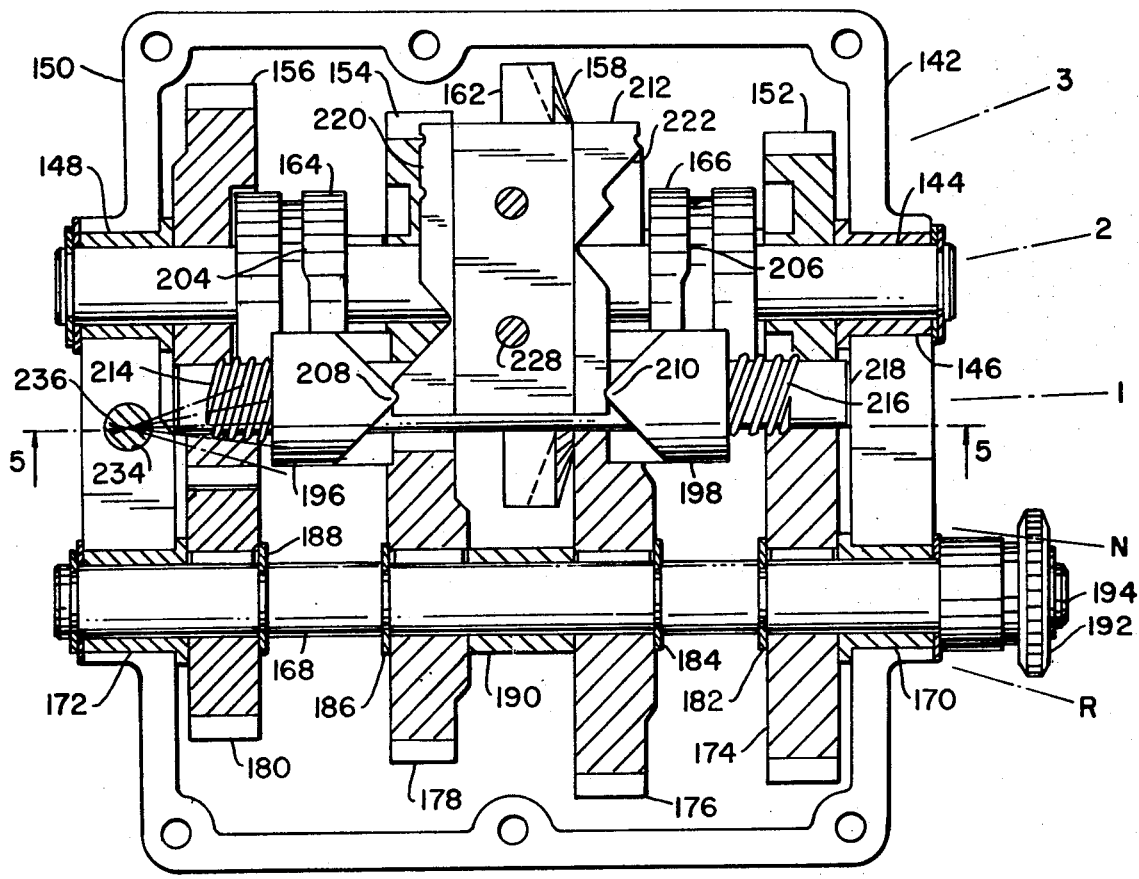
FIG. 4 is a top view of a gearbox with the top portion of the housing removed therefrom constructed in accordance with the invention and illustrating modified shifting mechanism in conjunction therewith.

Alternative shifting mechanism 122 is illustrated in conjunction with the gear box 142 illustrated best in FIG. 4. The gearbox 142 as shown is a four speed gearbox without reverse.

The gearbox 142 includes the drive shaft 144 mounted for rotation in bearings 146 and 148 secured in the gearbox housing 150. The spur gears 152, 154 and 156 and the combination gear 158 having the spur gear portion 160, best shown in FIG. 5, and the bevel gear portion 162 are rotatably mounted on shaft 144 for rotation relative thereto and against axial movement therealong.

The spur gear 162 of the combination gear 158 may be driven from a vertically extending drive shaft such as the drive shaft 14 to which a pinion, not shown, is rotatably secured in mesh with the bevel gear portion 162 of the combination gear 158 in the manner illustrated in FIG. 3 with respect to the transaxle structure 10.

The clutch members 164 and 166 are also mounted on the rotatable shaft 144. Clutch members 164 and 166 are movable axially of the shaft 144 and are restrained against rotation relative to the shaft 144 as before.

The driven shaft 168 is again positioned in the bearings 170 and 172 secured in the housing 150, the spur gears 174, 176, 178 and 180 are secured to the shaft 168 for rotation therewith. The gears 174, 176, 178 and 180 are separated axially on the shaft 168 by the retaining rings 182 and 184, the retaining rings 186 and 188 and the bushing 190. Gears 152 and 182, gears 154 and 178, gears 156 and 180 and the spur gear portion 160 of the combination gear 158 and the gear 176 are in mesh with each other as shown best in FIG. 4.

An output sprocket 192 is provided on the end 194 of the driven shaft 168. Sprocket 192 is driven at four separate speeds for a given driving speed of the combination gear 158 in accordance with the gear ratio of the meshed sets of gears in the gearbox 142 and the position of the clutch members 164 and 166 of the shift mechanism 122.

The shifting mechanism 122 includes the shifting forks 196 and 198 having the bifurcated end or yoke portion 200 and 202 positioned in the annular slots 204 and 206 on the exterior of the clutch members 164 and 166 respectively as in transaxle structure 10. The shifting forks 196 and 198 further include the nose portions 208 and 210 which limit the movement of the shifting forks 196 and 198 in the direction of the cam slide 212. As shown, the shifting forks 196 and 198 are sleeved over the shaft 218 for axial movement therealong under the urging of springs 214 and 216.

Figure 5:
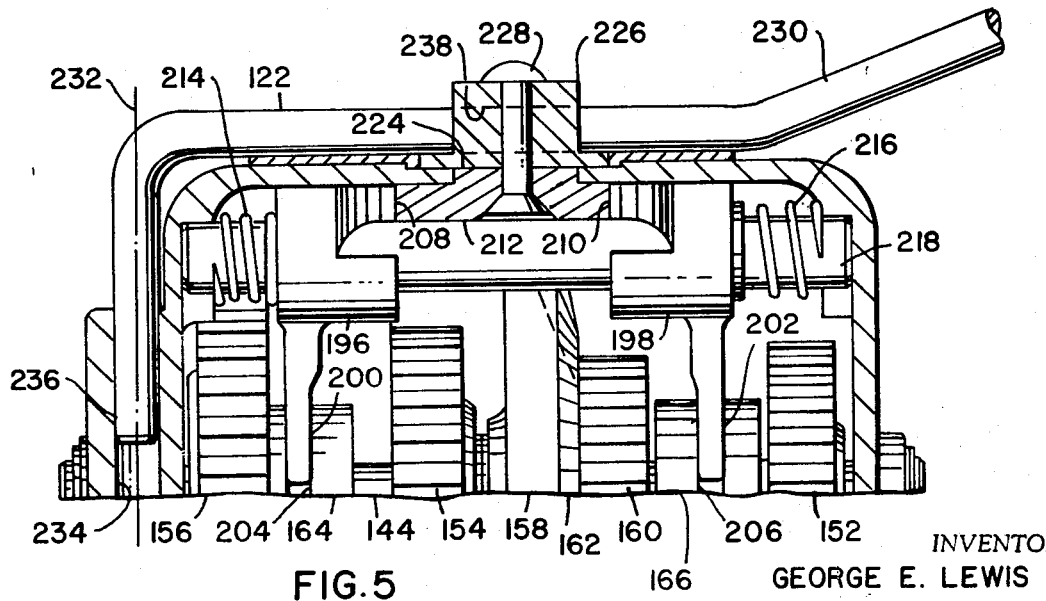
FIG. 5 is a partial section view of the gearbox illustrated in FIG. 4 taken substantially on the line 5—5 in FIG. 4.
Figure 9:
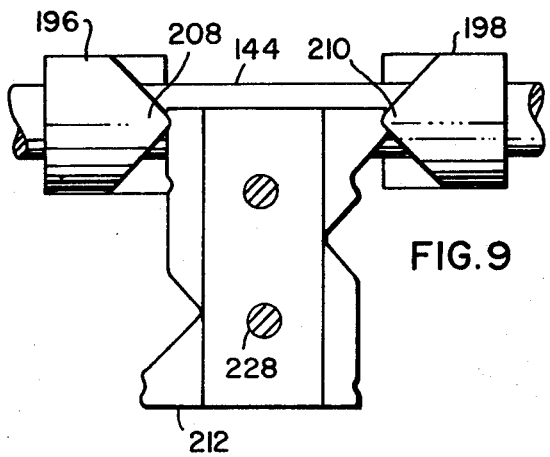
FIGS. 6–9 are plan views of the shifting mechanism illustrated in FIGS. 4 and 5 showing different shifted positions thereof.
Figure 8:
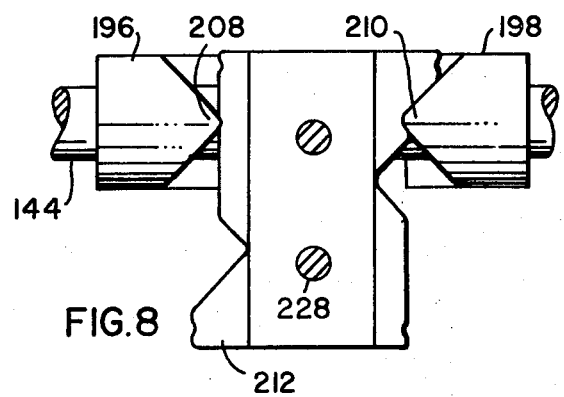
Figure 7:
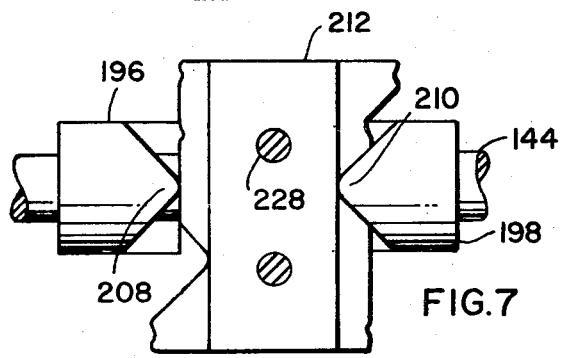
Figure 6:
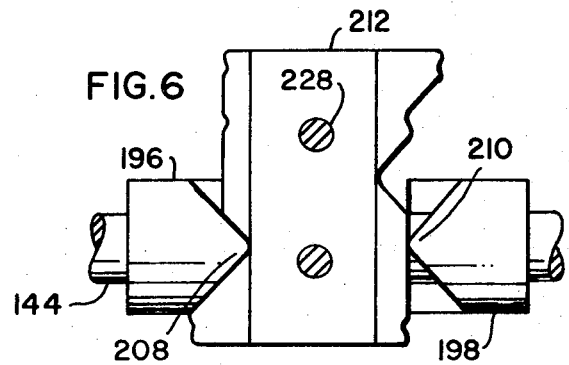

The cam slide 212 is T-shaped in cross section as best in FIG. 5 and has camming sides 220 and 222 thereon extending transversely of the shafts 144, 168 and 218 which as shown are parallel. The cam slide 212 is slidably received in a longitudinally extending opening 224 in the gearbox housing 150 and is secured therein by the clamping member 226 and the rivets 228.

In operation, on sliding movement of the cam slide 212 transversely of the shaft 218, the shifting forks 196 and 198 are caused to change position axially of shaft 218 whereby the clutch members 164 and 166 selectively engage the gears 152, 158, 154 and 156 to drive the driven shaft 168 and the output sprocket 192 at different speeds for a single drive speed of the combination gear 158.

The lever 230 of the shifting mechanism moves the cam slide 212 transversely of the shaft 144 on pivotal movement of the lever 230 about the pivot axis 232 illustrated best in FIG. 5 which is concentric with the axis of the cylindrical opening 234 in the housing 150 of the gearbox 142. As shown, the end 236 of the lever 230 extends within the cylindrical opening 234 of the housing 150. The lever 230 then extends perpendicularly and through the slot 238 in the bracket 226. Slot 238 is such that lost motion sufficient to prevent binding of the lever 230 in the slot 238 is provided between the bracket 226 and the lever 230.

In overall operation of the gearbox 142 with the lever 230 pivoted into an upper position so that the slide 212 is as shown in FIG. 4, the shifting fork 196 is in its left limit position on the shaft 218 so that the clutch member 164 engages the gear 156 and the driven shaft 194 is therefore rotated at its greatest speed for a given input speed of driving of the combination gear 158. On successive movement of the lever 230 clockwise in FIG. 4, the shifting forks 196 and 198 will be moved to successively engage the clutch member 164 with the gear 154, to engage the clutch member 166 with the combination gear 158, to place the shifting forks in a neutral position wherein no gears are engaged therewith, and to subsequently engage the clutch member 166 with the gear 152 with the lever in the lowermost position thereof which is indicated R, as shown in FIGS. 6, 7, 8 and 9 respectively.

In the gearbox 142 the gears 152 and 174, in place of providing a reverse drive for the driven shaft 194, provide a fourth drive speed in the same direction as the first, second and third gear drive speeds. If a reverse drive is desired, the gears 172 and 174 should be replaced with a chain and sprocket drive as is shown in the transaxle structures of FIGS. 1, 2 and 3.

Figure 10:
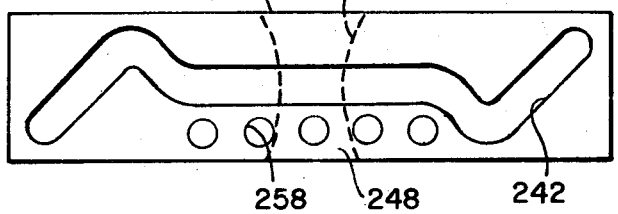
FIGS. 10 and 11 are bottom and elevation views respectively of modified cam structure for use in shifting mechanism such as that illustrated in FIGS. 4 and 5.
Figure 11:
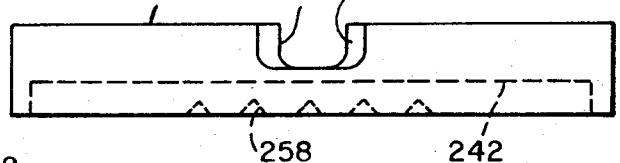
Figure 12:
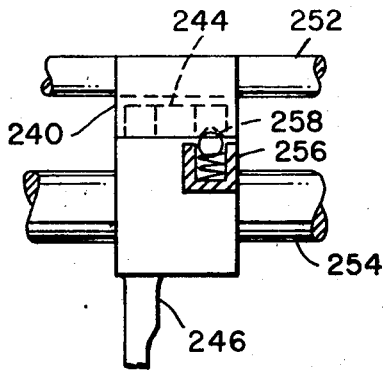
FIG. 12 is an end view of the modified cam structure illustrated in FIGS. 10 and 11 in assembly with a shifting fork and shifting lever of a shifting mechanism.

Alternatively, the cam slide 212 may be replaced by a pair of cam slides such as the cam slide 240 illustrated in FIG. 10. The cam slide 240 includes an internal camming slot 242 for receiving a pin 244 secured to shifting forks such as the shifting fork 246 illustrated in FIG. 12. The cam slide 240 further includes the recess 248 in the surface thereof opposite the slot 242 having arcuate sides 250 in which a shifting lever 252 may be positioned to move the cam slide 240 transversely of a shaft 254 on which the fork 246 is mounted for axial movement therealong in accordance with the position of the cam slide 240. Cam slide 240 positively positions the shifting fork 246 on movement in either direction of the cam slide so that no springs are needed in conjunction with the forks 246. Shifted positions may be recognized with the cam slide 240 by means of the spring loaded ball detent structure 256 which may be secured to the gearbox housing and the detent recesses 258 in the cam slide 240. Guide structure for the cam slide 240, not shown, may be provided in conjunction with a transmission housing as, for example, shown in FIG. 5.

While two embodiments of the present invention and modifications thereof have been considered in detail, it will be understood that other embodiments and modifications of the invention are contemplated. It is the intention to include within the scope of the invention all such embodiments and modifications of the invention as are defined by the scope of the appended claims.

What I claim as my invention is:

1. Transmission structure comprising a housing, drive means in the housing, driven means extending out of the housing, a first rotatable shaft positioned in the housing having a plurality of separate gears secured thereto for rotation therewith in axial fixed positions therealong, a second rotatable shaft positioned in said housing parallel to said first shaft and having a second plurality of gears positioned thereon for rotation relative to the second shaft and secured against axial movement with respect thereto in mesh with corresponding gears on the first shaft, clutch means secured to the second shaft for movement axially thereof and into engagement with individual gears on said second shaft and fixed against rotation with respect to the second shaft whereby on engagement of the clutch means with an individual gear on the second shaft rotation of the second shaft is accomplished at a speed in accordance with the gear engaged by the clutch means, means connecting one of said shafts to the drive means for rotation thereby, and means connecting the other of said shafts to the driven means for driving the driven means in accordance with the rotation of the one shaft and means for shifting the clutch means axially of the second shaft including a third shaft parallel to and positioned adjacent the second shaft, a pair of shifting forks positioned on the third shaft for movement axially thereof and engaged with the clutch means, a rotatable cam disc positioned adjacent the shifting forks, spring means for urging the shifting forks into engagement with the rotatable disc and lever means pivoted to the housing for rotating the rotatable disc to alternately engage different ones of said gears on said shaft.

2. Structure as set forth in claim 1 wherein the outer periphery of the rotatable disk is a cam surface engaged with the forks whereby on rotation of the disk the forks are moved axially of the third shaft into different positions on the third shaft for engaging the clutch means with different gears mounted on the second shaft.

3. Structure as set forth in claim 2 wherein the means for rotating the rotatable disk includes a shifting lever, a link secured to the shifting lever for movement therewith, a pin secured to the cam disk and pin and slot lost motion means operable between the link and the cam disk for rotating the cam disk about the center thereof upon pivoting of the shifting lever to move the link.

4. Transmission structure comprising a housing, drive means in the housing, driven means extending out of the housing, a first rotatable shaft positioned in the housing having a plurality of separate gears secured thereto for rotation therewith in axial fixed positions therealong, a second rotatable shaft positioned in said housing parallel to said first shaft and having a second plurality of gears positioned thereon for rotation relative to the second shaft and secured against axial movement with respect thereto in mesh with corresponding gears on the first shaft, clutch means secured to the second shaft for movement axially thereof and into engagement with individual gears on said second shaft and fixed against rotation with respect to the second shaft whereby on engagement of the clutch means with an individual gear on the second shaft rotation of the second shaft is accomplished at a speed in accordance with the gear engaged by the clutch means, means connecting one of said shafts to the drive means for rotation thereby, and means connecting the other of said shafts to the driven means for driving the driven means in accordance with the rotation of the one shaft and means for shifting the clutch means axially of the second shaft including a third shaft adjacent to the second shaft and extending parallel thereto, at least one shifting fork positioned on the third shaft for axial movement therealong and in engagement with the cam means, a cam slide engaged with the shifting fork, resilient means urging the shifting fork into engagement with the cam slide and a shifting lever pivoted to the housing for moving the cam slide in engagement with the shifting fork to alternatively engage different ones of said gears on said second shaft.

5. Structure as set forth in claim 4 wherein the shifting lever is pivoted to the housing for pivoting about an axis perpendicular to the shafts and extends substantially perpendicularly to the pivot axis thereof across the cam slide and means connecting the cam slide to the shifting lever permitting sliding therebetween on pivoting of the shifting lever to move the slide in a direction parallel to the shafts.

6. Structure as set forth in claim 5 wherein the cam slide includes at least one cam surface extending in the direction of movement of the cam slide and the shifting fork is engaged with the cam surface and further including means for slidably securing the cam slide to the housing for movement transversely of the shafts on pivotal movement of the lever.

7. Structure as set forth in claim 6 wherein the cam surface of the slide is an external cam surface forming one edge of the slide.

8. Structure as set forth in claim 6 wherein the cam surface is an internal cam surface in a slot in the cam slide and a pin is provided on the shifting fork extending into the slot in the cam slide.

9. Transmission structure comprising a housing, drive means in the housing, driven means extending out of the housing, a first rotatable shaft positioned in the housing having a plurality of separate gears secured thereto for rotation therewith in axial fixed positions therealong, a second rotatable shaft positioned in said housing parallel to said first shaft and having a second plurality of gears positioned thereon for rotation relative to the second shaft and secured against axial movement with respect thereto in mesh with corresponding gears on the first shaft, clutch means secured to the second shaft for movement axially thereof and into engagement with individual gears on said second shaft and fixed against rotation with respect to the second shaft whereby on engagement of the clutch means with an individual gear on the second shaft rotation of the second shaft is accomplished at a speed in accordance with the gear engaged by the clutch means, means connecting one of said shafts to the drive means for rotation thereby, and means connecting the other of said shafts to the driven means for driving the driven means in accordance with the rotation of the one shaft including a third shaft rotatably mounted on the same axis as the first shaft and spaced axially therefrom, a driving gear mounted on the second shaft for rotation therewith, a driven gear mounted on the third shaft for rotation therewith in mesh with the driving gear on the second shaft, a worm on the third shaft, a worm gear engaged with the worm on the second shaft and differential means engaged with the worm gear for driving the driven means and further including brake means operably associated with the third shaft for braking the rotating thereof and means for shifting the clutch means axially of the second shaft including cam means and a lever pivoted to the housing for actuating the cam means to alternatively engage different ones of said gears on said second shaft.

* * * * *